(12) United States Patent
Jaladi et al.

(10) Patent No.: US 11,757,867 B2
(45) Date of Patent: *Sep. 12, 2023

(54) SYSTEM AND METHOD FOR IMPLEMENTING HACKER TRAFFIC BARRIERS

(71) Applicant: PayPal, Inc., San Jose, CA (US)

(72) Inventors: Kishore Jaladi, Fremont, CA (US);
Darshan Desai, Fremont, CA (US);
Abhishek Chhibber, San Jose, CA (US)

(73) Assignee: PayPal, Inc., San Jose, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/563,572

(22) Filed: Dec. 28, 2021

(65) Prior Publication Data
US 2022/0124085 A1 Apr. 21, 2022

Related U.S. Application Data

(63) Continuation of application No. 16/448,585, filed on Jun. 21, 2019, now Pat. No. 11,245,689, which is a continuation of application No. 15/639,197, filed on Jun. 30, 2017, now Pat. No. 10,348,722.

(51) Int. Cl.
*H04L 9/40* (2022.01)
*H04L 9/32* (2006.01)
*H04L 9/30* (2006.01)
*G06Q 30/06* (2023.01)

(52) U.S. Cl.
CPC ........ *H04L 63/0853* (2013.01); *H04L 9/3213* (2013.01); *H04L 63/18* (2013.01); *G06Q 30/06* (2013.01); *H04L 9/30* (2013.01); *H04L 2209/56* (2013.01); *H04L 2209/80* (2013.01); *H04L 2463/102* (2013.01)

(58) Field of Classification Search
CPC ......... H04L 2463/082; H04L 2463/102; H04L 63/10; H04L 63/108; H04L 63/105; H04L 63/0853; H04L 63/18; H04L 9/3213; H04L 9/30; H04L 2209/56; H04L 2209/80; G06F 21/31; H04W 12/06; H04W 48/16; G06Q 20/3821; G06Q 20/4014; G06Q 20/02; G06Q 30/06
See application file for complete search history.

(56) References Cited

U.S. PATENT DOCUMENTS

| | | |
|---|---|---|
| 7,950,026 B1 | 5/2011 | Urbach |
| 8,646,060 B1 | 2/2014 | Ben Ayed |
| 8,832,812 B1 | 9/2014 | Morneau et al. |
| 8,855,310 B2 | 10/2014 | Kirkup et al. |
| 2007/0283163 A1 | 12/2007 | Relyea |
| 2013/0055362 A1 | 2/2013 | Rathbun |

(Continued)

FOREIGN PATENT DOCUMENTS

EP 3041185 A1 * 7/2016 ........... G06F 21/445

*Primary Examiner* — Brian F Shaw
(74) *Attorney, Agent, or Firm* — Haynes and Boone, LLP

(57) ABSTRACT

Systems and methods are presented for implementing hacker traffic barriers for mitigating unauthorized account usage. A security system securely associates a primary trusted device with a user using encrypted tokens stored in an enclave within the primary trusted device, authorizes web browser authentication, and provides both intrinsic and explicit checks for unauthorized access to an account.

20 Claims, 7 Drawing Sheets

(56) References Cited

U.S. PATENT DOCUMENTS

| | | |
|---|---|---|
| 2013/0205380 A1 | 8/2013 | Avni et al. |
| 2013/0262857 A1 | 10/2013 | Neuman et al. |
| 2015/0088676 A1* | 3/2015 | Elliott .................... G06Q 20/29 |
| | | 705/21 |
| 2015/0363581 A1 | 12/2015 | Ranadive et al. |
| 2016/0037346 A1 | 2/2016 | Boettcher et al. |
| 2016/0182643 A1* | 6/2016 | Badge ................... H04L 67/141 |
| | | 726/27 |

* cited by examiner

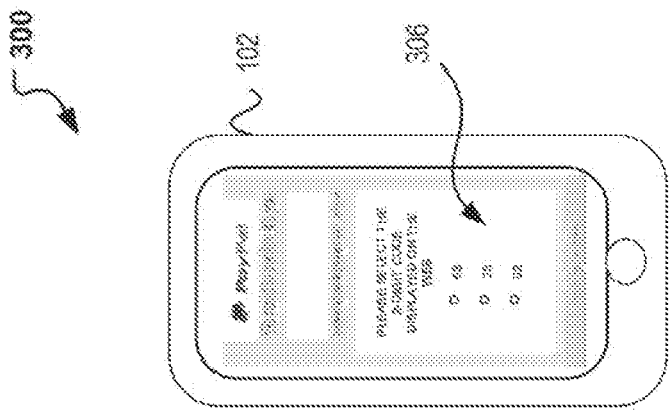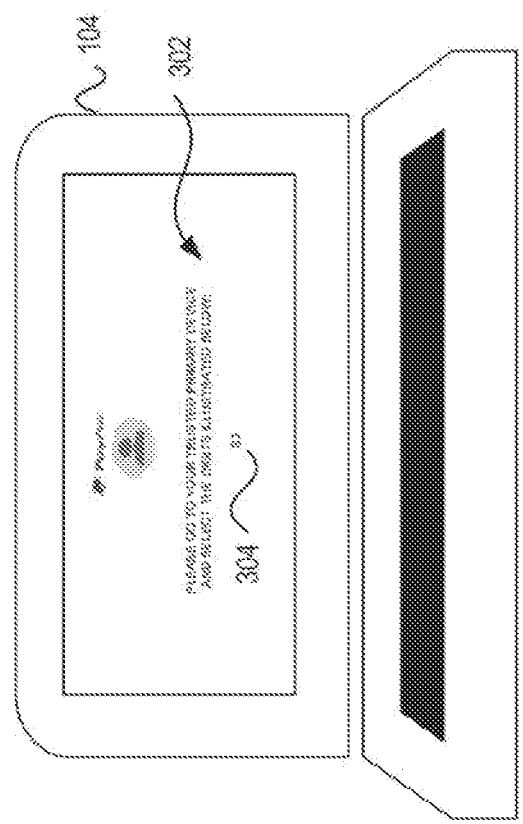
FIG. 3A

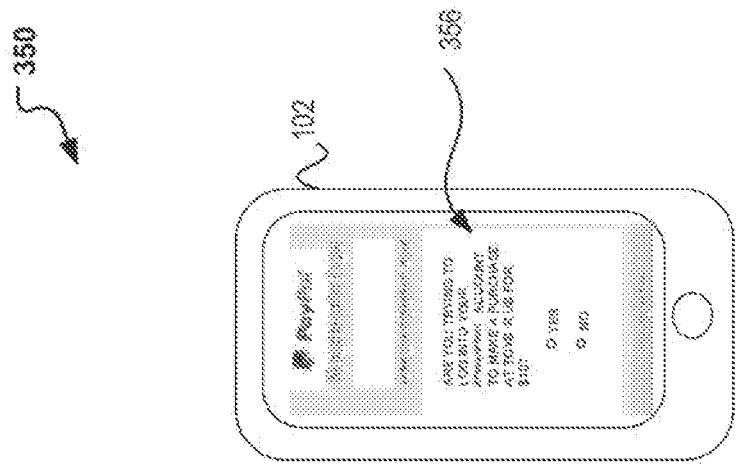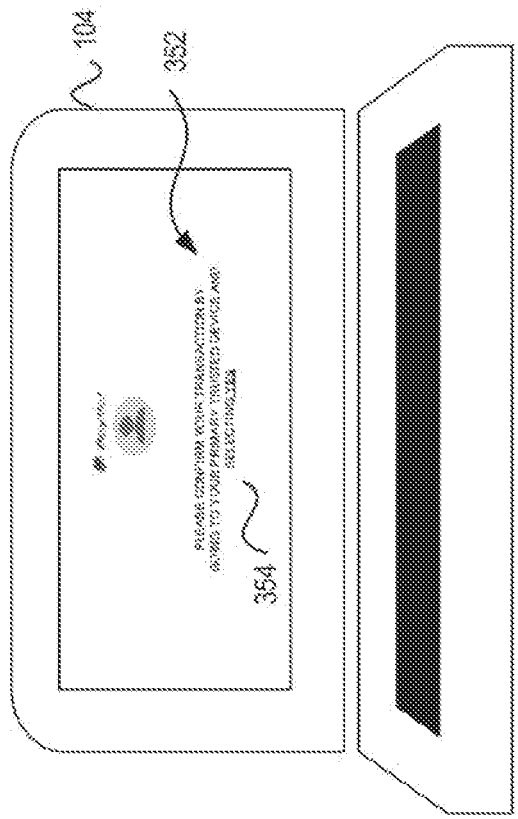
FIG. 3B

SYSTEM AND METHOD FOR IMPLEMENTING HACKER TRAFFIC BARRIERS

CROSS REFERENCE TO RELATED APPLICATIONS

This application is a continuation application of U.S. patent application Ser. No. 16/448,585, filed Jun. 21, 2019, which is a continuation of U.S. patent application Ser. No. 15/639,197, filed Jun. 30, 2017, now U.S. Pat. No. 10,348,722 of which are herein incorporated by reference in its entirety.

TECHNICAL FIELD

The present disclosure generally relates to authenticating communication devices, and more specifically, to authenticating communication devices using hacker traffic barriers.

BACKGROUND

Rapid advancements in technology and communications have led to the ubiquitous use of wireless electronics. As such, today's society has grown to become heavily device reliant, with a need to be constantly connected. This reliance has led to the use of electronics to make monetary transactions for goods and services.

For example, consumers can now go to a home computer to purchase an item at a children's store. Unfortunately, the use of electronic devices for the purchase of goods and services can often be susceptible to unauthorized use by another user and/or a hacker. This susceptibility can lead to loss of time, money as well as stress and frustration to a user. Therefore, it would be beneficial if a system were created that provides user authentication through the use of a trusted primary device in order to avoid unauthorized use of an account.

BRIEF DESCRIPTION OF THE FIGURES

FIG. 3A illustrates a communication with a trusted primary device for logging into a web browser.

FIG. 3B illustrates another communication with a trusted primary device for logging into the web browser.

Figure 1:
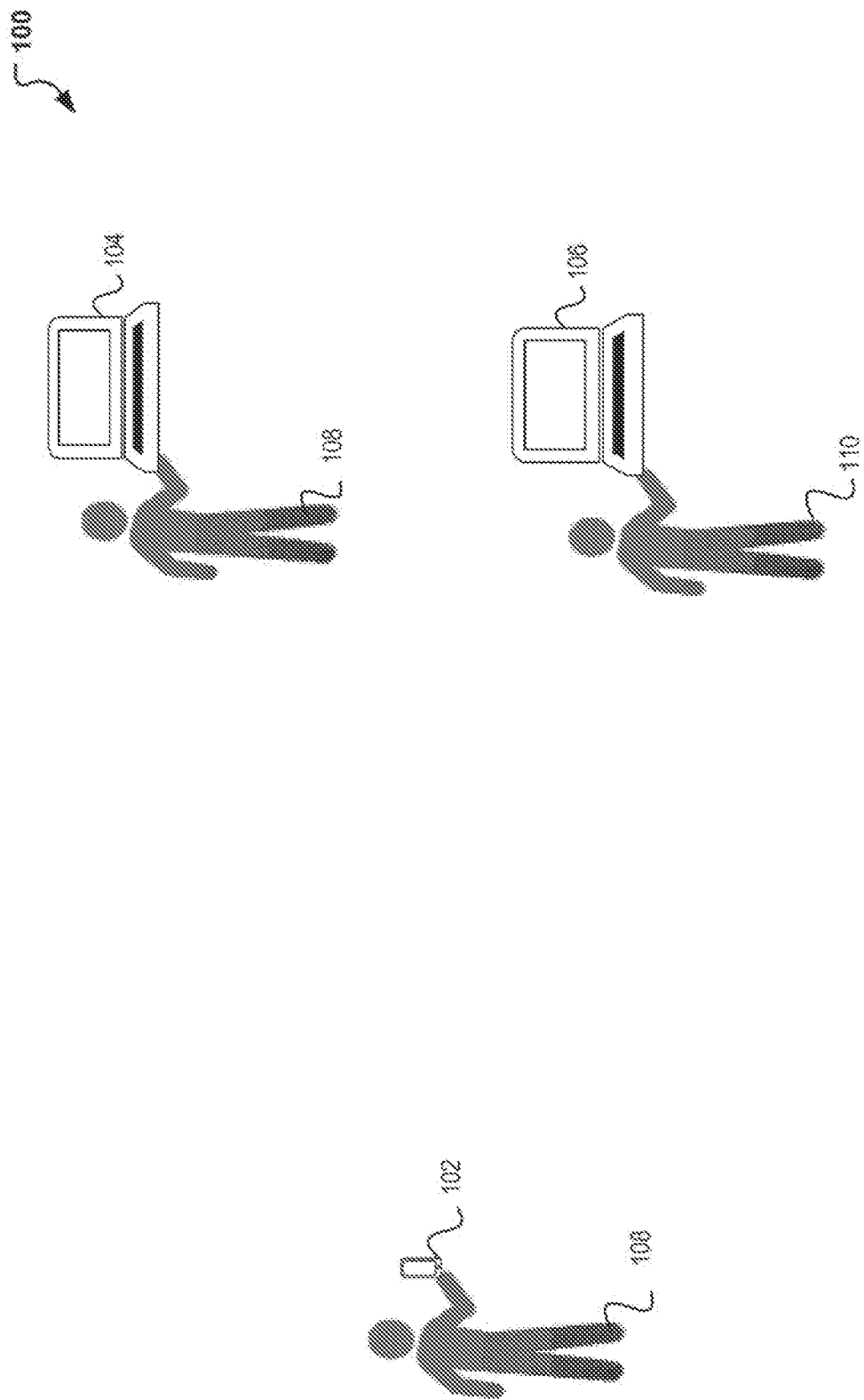
FIG. 1 illustrates a block diagram of a first user interaction with one or more devices for logging into a web browser.

Embodiments of the present disclosure and their advantages are best understood by referring to the detailed description that follows. It should be appreciated that like reference numerals are used to identify like elements illustrated in one or more of the figures, whereas showings therein are for purposes of illustrating embodiments of the present disclosure and not for purposes of limiting the same.

DETAILED DESCRIPTION

In the following description, specific details are set forth describing some embodiments consistent with the present disclosure. It will be apparent, however, to one skilled in the art that some embodiments may be practiced without some or all of these specific details. The specific embodiments disclosed herein are meant to be illustrative but not limiting. One skilled in the art may realize other elements that, although not specifically described here, are within the scope and the spirit of this disclosure. In addition, to avoid unnecessary repetition, one or more features shown and described in association with one embodiment may be incorporated into other embodiments unless specifically described otherwise or if the one or more features would make an embodiment non-functional.

Aspects of the present disclosure involve systems, methods, devices, and the like for implementing hacker traffic barriers for the mitigation of unauthorized account usage. In one embodiment, a system is introduced that can determine if a primary user device has been designated a trusted primary device. The primary user device will use a combination of a private key and secure token to obtain primary trusted device status. In another embodiment, a system is introduced which uses an intrinsic check to determine if multiple pending requests exist in requesting a login into a web browser. The intrinsic check can also include cancelling pending requests when multiple requests exist to ensure that a non-authorized user does not get access. Still in another embodiment, a system is introduced which uses explicit code exchange to ensure authorization is granted to a correct user. Yet still in another embodiment, a system is introduced which provides transactional and/or contextual data to a user to ensure that indeed a transaction is wanted and appropriately granted.

Rapid advances in communications have made portable electronic devices, such as smartphones and tablets, part of everyday life. Among other things, these electronic devices can be used to browse the web and purchase goods and services. However, with the growth in wearable devices, consumers are now dependent on using secondary devices for performing at least some of these tasks. In some instances, one or more electronics can be used to make the purchase. For example, the user may be logged into an application on a primary device and then use a secondary device in the next room to finish viewing and purchasing an item of interest. It may be said that the smartphone or tablet computer is a primary electronic device of a user, while a laptop, tablet, second smart phone or the like, is a secondary electronic device of the user. In some instances, the primary device may be designated a primary trusted device while a laptop is designated a secondary device. The primary device can be viewed as a device that is may be designated a trusted primary device (TPD) which can be used for making and/or confirming purchases. Through TPD designation, the primary device may have been provided with security codes and tokens that enable secure access to a native application on the primary device. Through this secure access, the primary device is able to make purchases through the use of an application. However, in some instances, a user may have a secondary device from which the user wants to make a purchase. The use of the secondary device and/or alternatively a web browser on the primary device for the purchase often involves access to the user account. In a current embodiment, a primary user device is defined as the device that provides such secure access and further provides checks that ensure that the secondary device trying to obtain access is indeed authorized to do so.

FIG. 1 illustrates a block diagram of a first user 108 interaction with one or more devices 102, 104. The devices 102, 104 can include a primary device 102 and secondary device 104 and as indicated, can be a smart phone, tablet, laptop, or the like. For exemplary purposes, primary device 102 can be a smart phone. As illustrated in FIG. 1, first user 108 can initially be interacting with a primary device 102. During the interaction, first user 108 can open and use a native application on the primary device 102. For example, the first user 108 can open an application associated with a merchant, a game, a digital wallet, a service/payment provider, etc. Opening the application, can include an initial login which uses a user name, password, email address, pin, or other form of authentication. After login, the user 108 may decide to make a purchase using a web browser associated with the application. The web browser, can be opened from the primary device 102 and/or a secondary device 104. As illustrated in FIG. 1, the secondary device 104 can be distinct from primary device 102 and can even occur at a distinct time and/or place. For example, first user 108 can be at home accessing his PayPal application on his phone (e.g., primary device 102), then move to his laptop (e.g., secondary device 104) in a next room to access PayPal's web browser or other merchant browser that includes a PayPal association. Like with the application on the primary device 102, the web browser on secondary device 104 can request a login and other user identification information in addition to an opt-in that the current primary device 102 is designated as the trusted primary device (TPD). During the initiation of the login however, other users may simultaneously try to access the user account. This access by other users (e.g., second user 110), however, may be from an unauthorized person or hacker trying to access the first user 108 account using an authorized device 106. In order to mitigate or eliminate such unwanted access, hacker traffic barriers are introduced that can provide numerous levels of authentication for more secure transactions.

In the current embodiment, a primary trusted device will be established, an intrinsic check will be performed for duplicate requests, and explicit checks verifying user authentication will be introduced. As a first barrier, a combination of a private key and secure token encryption will be used to securely authenticate an application on a device with a user account. For this authentication, a secure hardware such as an enclave is introduced which can store secure keys and/or tokens for authenticating the primary device 102. The use of the enclave and secure keys are described in further detail below and in conjunction with FIG. 2. As a second barrier, the system checks in the instance when a web browser login is initiated for duplicate requests. The system checks can include a check for pending request and the cancelation therefore if indeed multiple requests exist. Still as another barrier, the primary device is presented with information requesting the authentication and/or authorization of access and login to the web browser at the primary device 102 or secondary device 106.

Figure 2:
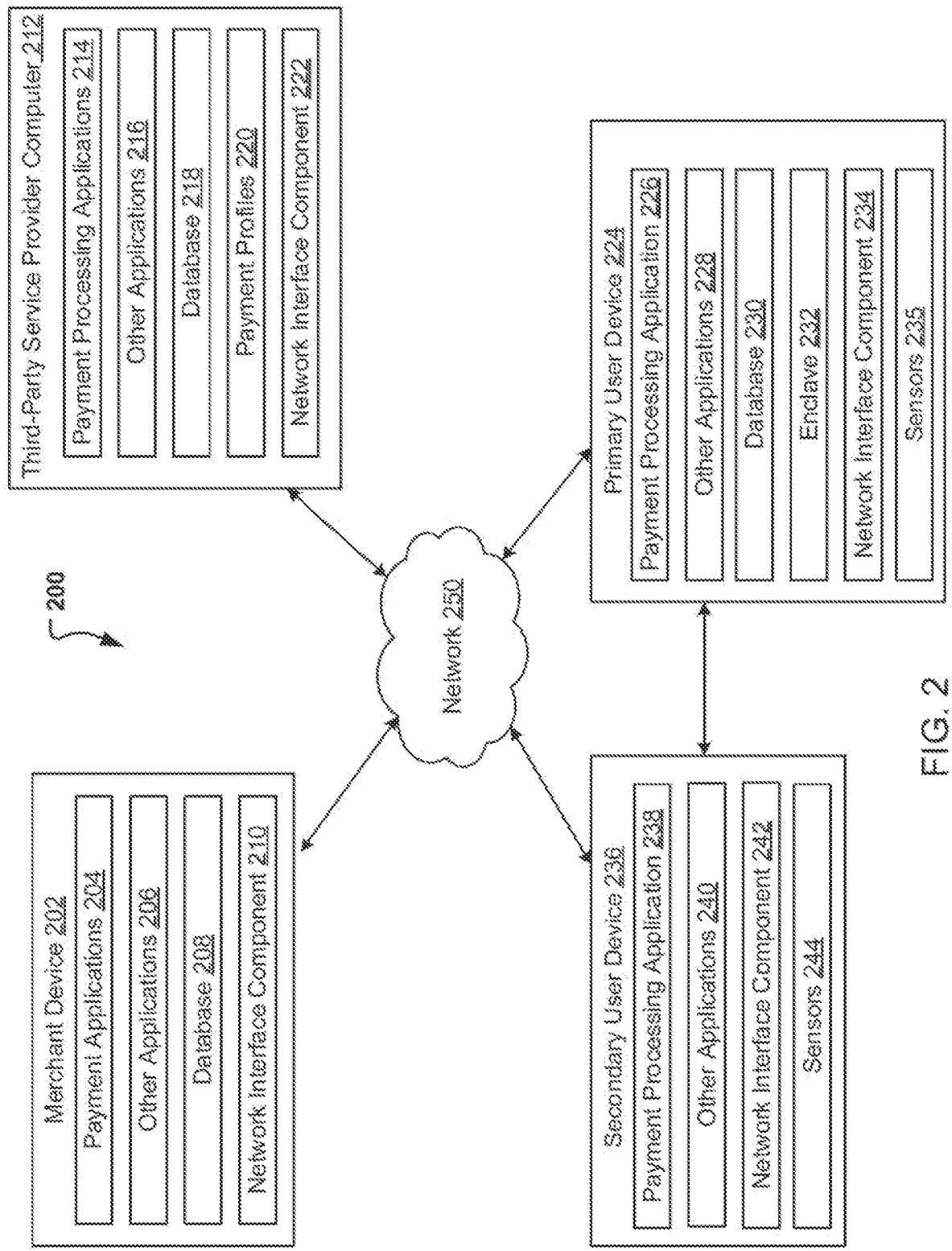
FIG. 2 illustrates a block diagram of a system for authenticating a user at a web browser.

FIG. 2 is a block diagram of a networked system 200 for implementing the processes described herein, according to an embodiment. In particular, FIG. 2 illustrates a block diagram of a system 200 for authenticating a user at a web browser. System 200 illustrates at least some of the interactions between multiple entities and/or devices for the authentication, use and purchase of a product or service with a merchant in association with a service provider. As shown, system 200 may include or implement a plurality of devices, computers, servers, and/or software components that operate to perform various methodologies in accordance with the described embodiments. It will be appreciated that the devices, computers, and/or servers illustrated in FIG. 2 may be deployed differently and that the operations performed and/or the services provided by such devices, computers, and/or servers may be combined or separated for a given embodiment and may be performed by a greater number or fewer number of devices, computers, and/or servers. Furthermore, one or more of the devices, computers, and/or servers may be operated and/or maintained by the same or different entities.

System 200 includes a merchant device 202, a primary user device 224 (e.g., primary device/trusted primary device 102), a third-party service provider computer 212, and a secondary user device 236 (e.g., secondary device 104) in communication over a network 250. The merchant device 202, primary user device 224, third-party service provider computer 212, and the secondary user device 236 may each include one or more processors, memories, and other appropriate components for executing computer-executable instructions such as program code and/or data. The computer-executable instructions may be stored on one or more computer readable mediums or computer readable devices to implement the various applications, data, and steps described herein. For example, such instructions may be stored in one or more computer readable media such as memories or data storage devices internal and/or external to various components of system 200, and/or accessible over network 250.

The merchant device 202 may be implemented as a communication device that may utilize appropriate hardware and software configured for wired and/or wireless communication with the primary user device 224, third-party service provider computer 212, and/or secondary user device 236. For example, the merchant device 202 may be implemented as a personal computer (PC), a smart phone, laptop/tablet computer, point-of-sale device, wristwatch with appropriate computer hardware resources, eyeglasses with appropriate computer hardware, other type of wearable computing device, implantable communication devices, and/or other types of computing devices capable of transmitting and/or receiving data. The merchant device 202 may correspond to and be utilized by a user, such as an employee of a merchant and/or another person authorized by the merchant.

The merchant device 202 may include one or more payment applications 204, other applications 206, a database 208, and a network interface component 210. The payment applications 204 and other applications 206 may correspond to executable processes, procedures, and/or applications with associated hardware. In other embodiments, merchant device 202 may include additional or different components having specialized hardware and/or software to perform operations associated with the payment applications 204 and/or the other applications 206.

The payment application 204 may facilitate financial transactions corresponding to the sale of goods and/or services offered by the merchant. For example, the payment application 204 may provide an interface for customers to purchase the goods or services and to receive customer payment information (e.g., customer credit card information). The payment application 204 may further transmit customer payment information to a payment processor (e.g., such as a payment processor corresponding to the third-party service provider computer 212 or the secondary user device 236) to process the customer payment information. The payment application 204 may also facilitate other types of financial transactions such as banking, online payments, money transfer, and/or the like.

The merchant device 202 may execute the other applications 206 to perform various other tasks and/or operations corresponding to the merchant device 202. For example, the other applications 206 may include security applications for implementing client-side security features, programmatic client applications for interfacing with appropriate application programming interfaces (APIs) over network 250, or other types of applications. The other applications 206 may also include additional communication applications, such as email, texting, voice, and instant messaging (IM) applications that enable a user 106 to send and receive emails, calls, texts, and other notifications through the network 250. In various embodiments, the other applications 206 may include location detection applications, such as a mapping, compass, and/or global positioning system (GPS) applications, which may be used to determine a location of the merchant device 202. The other applications may 206 include social networking applications. Additionally, the other applications 206 may include device interfaces and other display modules that may receive input and/or output information. For example, the other applications 206 may include a graphical user interface (GUI) configured to provide an interface to the user.

The merchant device 202 may further include a database 208, which may be stored in a memory and/or other storage device of the merchant device 202. The database 208 may include, for example, identifiers (IDs) such as operating system registry entries, cookies associated with the payment application 204, tokens, encryption keys, and/or other applications 206, IDs associated with hardware of the network interface component 210, IDs used for payment/user/device authentication or identification, and/or other appropriate IDs. The database 208 may also include information corresponding to one or purchase transactions of customers who have purchased goods or services from the merchant, browsing histories of the customers, or other types of customer information. In certain embodiments, the merchant device 202 may also include information corresponding to payment tokens, such as payment tokens generated by the third-party service provider computer 212 and/or generated by the secondary user device 236.

The merchant device 202 may also include at least one network interface component 210 configured to communicate with various other devices such as the primary user device 224, the third-party service provider computer 212, and/or the secondary user device 236. In various embodiments, network interface component 210 may include a Digital Subscriber Line (DSL) modem, a Public Switched Telephone Network (PTSN) modem, an Ethernet device, a broadband device, a satellite device and/or various other types of wired and/or wireless network communication devices including microwave, radio frequency, infrared, Bluetooth®, Bluetooth low-energy, near field communication (NFC) devices, and/or the like.

The third-party service provider computer 212 may be maintained, for example, by a third-party service provider, which may provide payment processing services for the merchant. In one example, the third-party service provider may be provided by PAYPAL®, Inc. of San Jose, Calif., USA. Alternatively, the third-party service provider computer 212 may be associated with a user of the primary and secondary device 224, 236. As such, the third-party service provider computer 212 includes one or more payment processing applications 214, which may be configured to process payment information received from the merchant device 202 or from a selection at the primary or secondary user device 224, 236. For example, the payment application 204 of the merchant device 202 may receive payment information from a customer to purchase a service or good offered by the merchant. Upon receipt of the payment information, the payment application 204 may transmit the payment information to the third-party service provider computer 212. The payment processing application 214 of the third-party service provider computer 212 may receive and process the payment information. As another example, the payment application 204 can present a payment code on a display of the user device associated with the merchant. The payment code can be scanned or transmitted to the merchant device 202 for payment processing.

The third-party service provider computer 212 may execute the other applications 216 to perform various other tasks and/or operations corresponding to the third-party service provider computer 212. For example, the other applications 216 may include security applications for implementing client-side security features, programmatic client applications for interfacing with appropriate APIs over the network 250, or other types of applications. The other applications 216 may also include additional communication applications, such as email, texting, voice, and IM applications that enable communication of emails, calls, texts, and other notifications through the network 250. In various embodiments, the other applications 216 may include location detection applications, such as a mapping, compass, and/or GPS applications, which may be used to determine a location of the third-party service provider computer 212. Additionally, the other applications 216 may include device interfaces and other display modules that may receive input and/or output information. For example, the other applications 216 may include a GUI configured to provide an interface to one or more users.

The third-party service provider computer 212 may further include a database 218, which may be stored in a memory and/or other storage device of the third-party service provider computer 212. The database 218 may include, for example, IDs such as operating system registry entries, cookies associated with the payment processing application 214 and/or other the applications 216, IDs associated with hardware of the network interface component 222, IDs used for payment/user/device authentication or identification, and/or other appropriate IDs.

According to a particular embodiment, the third-party service provider computer 212 may include a set of payment profiles 220 corresponding to past sales transactions executed by the merchant device 202 with respect to one or more customers of the merchant. Alternatively, the third-party service provider computer 212 may include a set of merchant payment profiles corresponding to the payment sources associated to a corresponding merchant. For example, a particular payment profile from the set of payment profiles 220 may include payment information corresponding to a particular customer of the merchant and/or a merchant associated with a user. The payment information may include credit card information (e.g., card number, expiration date, security code, card issuer, and/or the like), Automated Clearing House (ACH) information (e.g., account number, routing number, and/or the like), identification information associated with the particular customer/user (e.g., a customer identifier, name, address, phone number, date of birth, and/or the like), billing information, and/or any other type of payment information associated with the particular customer. Furthermore, other payment profiles of the set of payment profiles 220 may include payment information corresponding to other customers of the merchant and/or other merchants associated with the user. In addition, the third-party service provider computer 212 may store the set of payment profiles 220 according to a first file format.

The third-party service provider computer 212 may also store a set of payment tokens corresponding to the set of payment profiles 220. For example, each payment profile of the set of payment profiles 220 may be associated with a corresponding payment token from the set of payment tokens. In some embodiments, each payment profile may include a corresponding payment token from the set of payment tokens. The set of payment tokens may be particular to the third-party service provider computer 212 (e.g., computers from other service providers may be unable to use the set of payment tokens) and may enable the merchant device 202 to more securely process payment transactions with the third-party service provider computer 212. For example, in order to process a payment transaction that involves a credit card number associated with a particular payment profile, the third-party service provider computer 212 may provide the merchant device 202 with a particular payment token that is different from the credit card number. The merchant device 202 may use the particular payment token to process the payment transaction instead of the credit card number. Further, the merchant device may store and associate the particular payment token with the particular payment profile instead of the credit card number, thereby protecting the credit card number from being stolen in a potential security breach of the merchant device 202.

In various embodiments, the third-party service provider computer 212 also includes at least one network interface component 222 that is configured to communicate with the merchant device 202, the primary user device 224, and/or the secondary user device 236 via the network 250. Further, the network interface component 222 may comprise a DSL modem, a PSTN modem, an Ethernet device, a broadband device, a satellite device and/or various other types of wired and/or wireless network communication devices including microwave, RF, and IR communication devices.

The primary user device 224 may be implemented as a communication device that may utilize appropriate hardware and software configured for wired and/or wireless communication with the merchant device 202, third-party service provider computer 212, and/or the secondary user device 236. The primary user device 224, may be a personal computer (PC), a smart phone, laptop/tablet computer, wristwatch with appropriate computer hardware resources, eyeglasses with appropriate computer hardware (e.g. GOOGLE GLASS®), other type of wearable computing device, implantable communication devices, and/or other types of computing devices capable of transmitting and/or receiving data. In one embodiment, the primary user device 224 may be mobile device 102 communicating with second device 104, a merchant device and/or service provider 212.

The primary user device 224 may include a payment processing application 226 that may be used as a digital wallet that can communicate with a merchant device 202, secondary user device 236, and/or third party service provider 212 for purchasing and transacting. The payment processing application 226, can work jointly with database 230 for retrieving bank account information, user accounts, security codes, tokens that may be associated with various merchant locations. Similarly, the payment processing application, can also provide access to the user profiles for determining which payment method, processing code, to use at a merchant location. The primary user device 224 may include an enclave 232 which can be a secure hardware level storage are designated for the payment processing application 226. The enclave 232 can enable the storage of private and public keys and a randomly generated token that enables the secure communication and validation of the user of the payment processing application with the third party service provider 212.

In one embodiment, the primary device 102 uses a private key and secure token encryption for communicating with the payment processing application 226. The secure token can be pushed in a silent tone in an out of band notification between the payment processing application (e.g., Paypal application) and a server. In other words, when the payment processing application 226 is first installed, two keys are generated, a private key and a public key. The private key is put in the secure enclave 232 and the public key is sent to the database 218 or other server associated with the third-party service provider 212. Therefore, when a user associated with the primary user device 224, first logs into the payment processing application 226, if the login is successful a server associated with the third-party service provider 212 or even a merchant device 202 initiates a silent tone notification to the payment processing application 226. The push notification can be an out-of-band notification which ensures a secure access through the use of the silent tone notification including the transmission of a token. Thus, a request for access from the payment processing application 226, should include the token encrypted which can be decrypted with the public key that was originally transmitted.

The primary user device 224 may also include other applications 228 to perform various other tasks and/or operations corresponding to the primary user device 224. For example, the other applications 228 may facilitate communication with the merchant device 202, such as to receive an indication, from the merchant device 202, to switch payment processing services from the third-party service provider to the service provider. As another example, the other applications 228 may include security applications, application that enable designation of a primary interactive device, and applications that allow for web site searches (including access to merchant websites). The other applications 228 may also include additional communication applications, such as email, texting, voice, and IM applications that enable communication of emails, calls, texts, and other notifications through the network 250. In various embodiments, the other applications 228 may include location detection applications, such as a mapping, compass, and/or GPS applications, which may be used to determine a location of the user device 224. The other applications may 228 social networking applications. Additionally, the other applications 228 may include device interfaces and other display modules that may receive input and/or output information. For example, the other applications 228 may include a GUI configured to provide an interface to one or more users.

The primary user device 224 may further include a database 230, which may be stored in a memory and/or other storage device of the primary user device 224. The database 230 may include, for example, identifiers (IDs) such as operating system registry entries, cookies associated with a web browser and/or the other applications 228, IDs associated with hardware of the network interface component 234, IDs used for payment/user/device authentication or identification, bank information, merchant information, user accounts, and/or other appropriate IDs. In addition, the database 230 may include user identifier information which can be used in conjunction with secondary user device 236 during an explicit code exchange and/or contextual information for web browser authentication.

Primary user device 224, can also be equipped with various sensors 234 to provide sensed characteristics about the primary user device 224 and its environment. For example, the sensors 234 can include a camera for taking images of the surroundings used to determine the information to provide a user (e.g., camera take image of Macy's so a Macy's QR code is presented on the primary interactive device). As another example, the sensors 234 can include microphones for receiving audio signals which can be used to detect location, and other relevant terms that may be spoken. Further, the sensors 234 can include an accelerometer, a light sensor, a biometric sensor, temperature sensor, etc. For example, the biometric sensor can be used to collect a user fingerprint scan. Each type of sensor providing various characteristics about the device, user, or environment.

The primary user device 224 may also include at least one network interface component 110 configured to communicate with various other devices such as the merchant device 202, the third-party service provider computer 212, and/or the secondary user device 236. In various embodiments, network interface component 234 may include a Digital Subscriber Line (DSL) modem, a Public Switched Telephone Network (PTSN) modem, an Ethernet device, a broadband device, a satellite device and/or various other types of wired and/or wireless network communication devices including microwave, radio frequency, infrared, Bluetooth®, Bluetooth low-energy, near field communication (NFC) devices, and/or the like.

As indicated above, a secondary user device 236 (e.g., secondary device 104) may be presently available and used by a consumer (e.g., user 106). The secondary user device 236, much like the primary user device may be equipped with payment processing applications 238 as well as other applications 240. The payment processing applications 238 and other applications 240 may be used to perform various tasks and/or operations corresponding to the secondary user device 236. The other applications 228 may include additional communication applications, such as email, texting, voice, and IM applications that enable communication of emails, calls, texts, and other notifications through the network 250. In addition, the other applications 228 may include location detection applications, such as a mapping, compass, and/or GPS applications, which may be used to determine a location of the secondary user device 236. The other applications may further include 228 social networking applications and device interfaces and other display modules that may receive input and/or output information For example, the applications 238, 240 may facilitate communication with the merchant device 202, such as by presenting a QR code that may be used for making a purchase. As another example, the applications 238, 240 may provide notice of an incoming call or text to the user 106 of the secondary user device 236. Still as another example, the applications 238,240 can provide details and/or login information for authentication by the primary user device 224.

The secondary user device 236 may also include a network interface component 242 for connecting and interacting with at least primary user device 224, merchant user device 202, and/or third-party service provider computer 212 over network 250. The network interface component 242 may comprise a DSL modem, a PSTN modem, an Ethernet device, a broadband device, a satellite device and/or various other types of wired and/or wireless network communication devices including microwave, RF, and IR communication devices.

The network 250 may be implemented as a single network or a combination of multiple networks. For example, in various embodiments, the network 250 may include the Internet or one or more intranets, landline networks, wireless networks, and/or other appropriate types of networks. Thus, the network 250 may correspond to small scale communication networks, such as a private or local area network, or a larger scale network, such as a wide area network or the Internet, accessible by the various components of system 200.

In addition, the secondary user device 236 can also include sensors 244 that may be used for providing measured information about the user, device, location, environment, etc. The sensors can be used to detect light (is device in a pocket), biometric data (is user working out), location (user is in a meeting, call received), etc. Further, the sensors 244 can also be used to determine proximity between devices and location of interest as well as determine processor usage and/or signal strength which may be used to characterize the device for determining the interaction state of the secondary user device 236.

Further to system 200, the primary user device 224 upon initial install and designation as trusted primary device (TPD), can be used to ensure secondary access to an application such as the service processing application and/or corresponding web browser are legitimate. In this instance, the primary device 102 and/or secondary device 104 trying to access the web browser can be checked for authenticity. In a current embodiment, a first check can be an intrinsic check, where the first check can be to determine whether multiple login requests exist. For example, when a web browser login is initiated, system 200 can first determine whether a pending login request already exists. If indeed a request already exists, then the situation may exists that both the first user 106 and a second user 108 are trying to login in. To avoid accidentally giving access to second user 108 which can be an unauthorized user, therefore if multiple requests exist, the system will cancel the requests. Prior to cancelling the requests, system 200 can do a second check a unique random identifier associated with the web browser. For example, browsers using a PayPal account are provided a unique random identifier and every web browser login request pushes the unique random identifier. Therefore, system 200 can check if the pending request and incoming requests are coming from the same or a different browser. If the pending request is not from the same browser as the pending one, then unauthorized secondary user (e.g., hacker) activity can be suspected. In this instance, the pending login request will be cancelled and a notification can be transmitted to the trusted primary device (e.g., primary device 102) indicating that a conflict exists and that the request should be attempted at a later time and/or that hacker activity is suspected. If the pending request includes the unique random identifier, then the assumption can be that an authorized web browser is attempting login and a duplicate request has been submitted. In this instance, the pending request in the queue is cancelled and a notification is sent requesting a resend at a later time. If no pending request exists then system 200 can then continue with yet another check by considering whether a new user is attempting to login to the browser. For this check, the cookies associated with the user are checked. If the it is determined that the identifier/cookie on the web browser is not recognized, then the system 200 can again assume unauthorized access and a secondary form of identification is requested for authorization to login to the web browser. For example, if the web browser request is coming from the secondary device 104, then trusted primary device 102 can be sent a notification requesting confirmation of such actions by the secondary device 104.

In the example, where the user 108 is attempting to access a web browser from secondary device 104, the primary user device 102 can receive a notification of such request. The notification can arrive with a request for user action at the primary device 102. FIGS. 3A-3B illustrates a communication with a trusted primary device 102 for logging into a web browser by secondary device 104. In particular, FIGS. 3A-3B provide exemplary examples of the notification that can be sent. In FIG. 3A, the secondary device 104 is communicating 300 with primary device 102 and prompted with an instruction 302 to check the primary user device for verification. Instruction 302 as illustrated can include a request for the user of secondary device 104 to go to the primary device 104. Instruction 302 as illustrated in FIG. 3A, can also include a unique code 304 that is to be selected from a list of codes that will be presented on the primary device 102. Primary device 102 will instruct the user 108 the further confirmation is needed that he/she is attempting to login to a web browser. As confirmation, the user 108 can be prompted with a series of codes 306. User 108 is to then select the code (e.g., 63) that matches the one presented in the secondary device 104.

FIG. 3B illustrates another form of device 102, 104 communication 350 for authentication and access to web login. In FIG. 3B, similar to FIG. 3A, a user 108 is also instructed 352 to go to the primary device 102 for authentication. In this instruction 352 however, user 108 is asked to verify a transaction. Note that this form (as illustrated in FIGS. 3A-3B) of authentication can occur during initial web login and/or during a transaction request. FIG. 3A, for example illustrates authentication for authorization of a purchase, however the instructions can be modified to include a confirmation of a desired to login. In this instance, instructions 352 provide a correct selection 354 to make at primary device 102 in order to accept the purchase. For example, in FIG. 3B, the primary device 102 is providing contextual information 356 about the transaction. In particular, primary device 102 is requesting a confirmation of a purchase at "Toys a Us" for $10.

Note that the codes and contextual information are but an exemplary methods for authenticating a user. The authentication can also include other authenticating information from which to select such as but not limited to, figures, colors, designs, unique identifiers, account numbers, etc. In addition or alternatively, authentication can be acquired through the use of sensors. For example, the primary device 102 and/or secondary device 104 can request a fingerprint scan, retinal scan, a picture of the user, body conditions, etc.

Figure 4:
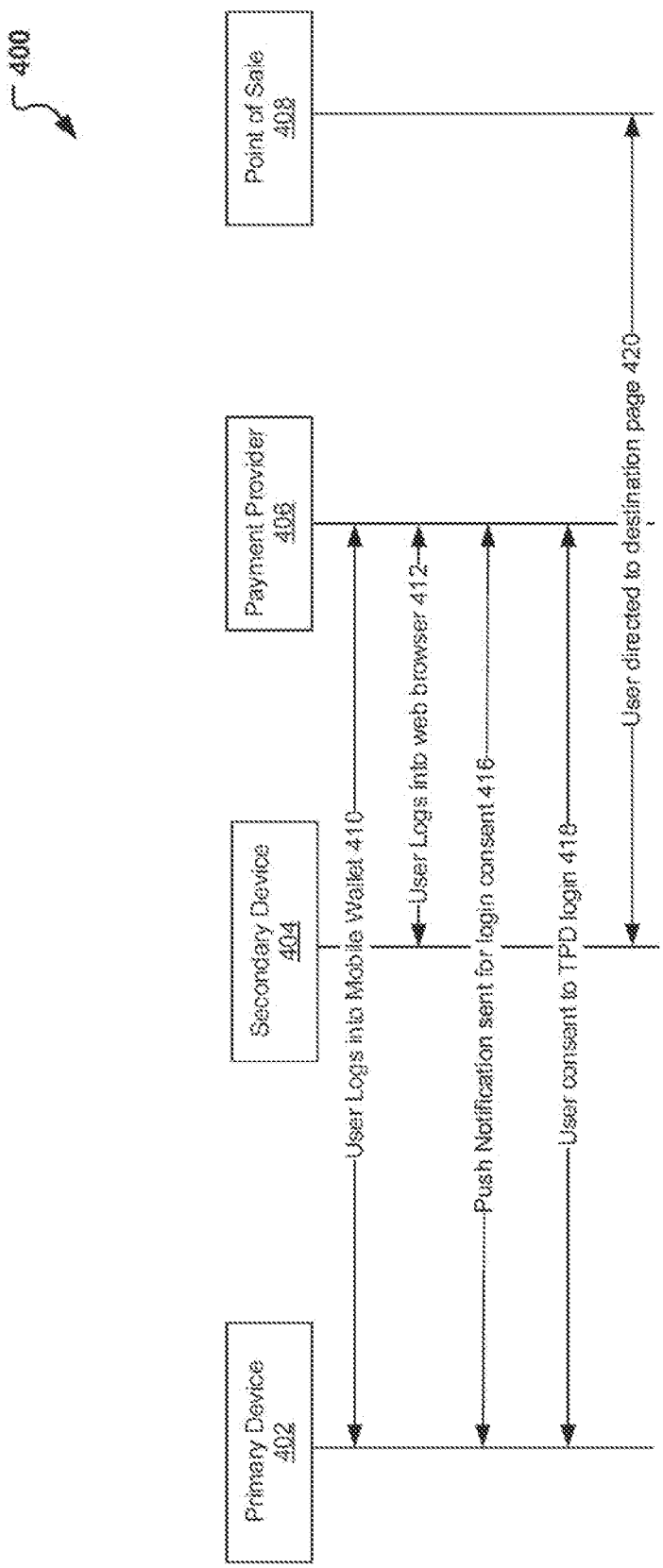
FIG. 4 illustrates a timing diagram of communication with a trusted primary device and a secondary device for logging into a web browser.

FIG. 4 illustrates a timing diagram of communication with a trusted primary device and a secondary device for logging into a web browser. In timing diagram 400, an exemplary interaction with a merchant, payment provider, and secondary device is illustrated. Timing diagram 400 begins with the interaction between primary device 302 (e.g., primary trusted device 102) and payment provider 406 (e.g., third party service provider). As an initial interaction, the user 108 logs into a mobile wallet 410. During this interaction the primary device 402 communicates with the service provider 406 using the public key to decrypt and act as a trusted primary device. At a later instance, a user 108 logs into a web browser 412 in order to perform a transaction. To log into the web browser associated with the payment provider 406, a login request is initiated which gets checked for duplicate requests. Once that check has cleared, then at the following instance in time, a notification is pushed 416 from the payment provider 406 to the primary device 402. The notification is a request for consent from primary device 402 to the secondary device 404. The consent, if accepted 418, grants the secondary device 404 web browser login access. Therefore, upon receiving user consent at the payment provider 406, the secondary device 404 is directed to the desired destination page 420 which can include account information and other transactional information. Note that this timing diagram may have more or less interactions than those illustrated in FIG. 4. In addition, one or more of the instances can occur simultaneously and/or in differing order than that described.

Figure 5:
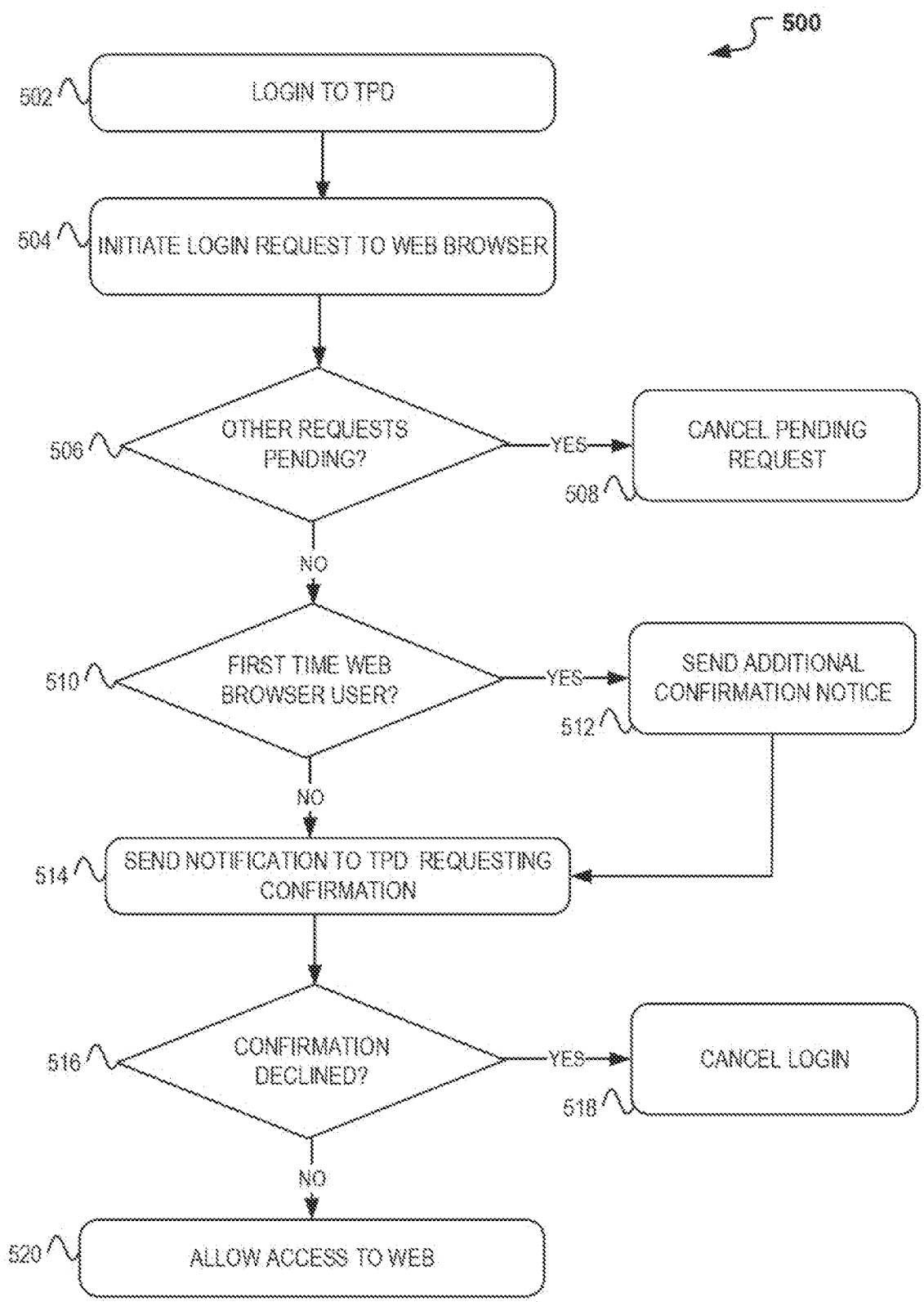
FIG. 5 illustrates a flow diagram illustrating operations for logging into a web browser using hacker traffic barriers.

FIG. 5 illustrates example process 500 for implementing hacker traffic barriers by a system such as computing system 200 of FIG. 2 and/or timing 400 of FIG. 4. In particular, FIG. 5 illustrates a flow diagram illustrating operations for authenticating a web browser login through the interaction with a trusted primary device along with some intrinsic and explicit checks on the device initiating the login request. According to some embodiments, process 500 may include one or more of operations 502-520, which may be implemented, at least in part, in the form of executable code stored on a non-transitory, tangible, machine readable media that, when run on one or more hardware processors, may cause a system to perform one or more of the operations 502-520.

Process 500 may begin with operation 502, where the user is logged into a trusted primary device (e.g., primary device) and/or if not previously done, opts-in to use the device as a trusted primary device (TPD). As indicated, the trusted primary device can be a smart phone, tablet, laptop, or the like. As an example, the trusted primary device can be a smart mobile device. In one embodiment, as an initial hacker traffic barrier, at initial install, prior to logging in as a trusted primary device, designation (opt-in) of the smart mobile device as a trusted primary device occurs. This designation occurs through the generation of both a private and public key, the use of a secure enclave located in the smart mobile device to ensure restricted access, and the transmission of the public key to a server/storage module of a corresponding application. Once the smart mobile device is designated as the trusted primary device, every time a user logs into the application (e.g., PayPal app) a silent tone notification is pushed with an encrypted token that is decrypted with the use of the public key that was generated and transmitted during initial install. Note that in some instances opt-in as TPD is completed prior to and is mutually exclusive from the user login attempt to the web.

Once logged in, the user may decide to use a web browser associated with the application for making a transaction. In method 500, step 504 is performed with the initiation of a login request from the web browser. Initiating the request includes the introduction of several intrinsic checks as a second hacker traffic barrier. Step 506 initiates the first check with a check for other pending web browser requests. This includes checking for duplicate request for web browser login access. To check for duplicate requests, an initial search and determination is made as to whether the pending request is coming from a same browser and whether the request received includes a known unique random identifier. When a login request is transmitted, a unique random identifier is pushed with the transmission and thus a system can perform an initial check to determine if the incoming request is coming from the same web browser or a difference web browser.

If indeed other pending requests exist, then process 500 continues to step 508 where the pending requests are cancelled. Prior to cancelling the request, other checks may be introduced (not shown) which include the transmission of a notification to the user of duplicate requests. The notification can be tailored based on the findings from the check of the unique random identifier. That is to say, if a duplicate request exists and it is from a known unique random identifier, then it is likely that the user transmitted the request twice and thus the request is cancelled and user may be asked to try again. Alternatively, if the duplicate request check yields unknown unique random identifiers, then this is may be an unauthorized attempt to access an account and thus the request is cancelled and a notification to the user of the trusted primary device is sent with an indication that a possible hacker attempt may exist or that precautions should be taken. That is to say, if the request is coming from the same browser, the system can request a retry by canceling the pending request and picking up a new request. Alternatively, if the request comes from a different browser, the system blocks/cancels both of the requests and the system can then request that the user retry after a given time to avoid a possible hacker scenario.

Returning to process 500, at step 506, if no other pending requests exist, then the process 500 continues to step 510. At step 510, yet another check is performed regarding the authentication of the user. At step 510, a determination is made as to whether the login request derives from a first time web browser user. This check can be performed by checking cookies and/or other identifiers that arrive with the request which further identify the origin of the web browser request. If the cookies or other identifier are not recognized, then the user may be using a new device that has not been previously identified and process 500 continues to step 512. At step 512, a notification (as another hacker traffic barrier) can be sent to the user requesting an additional user confirmation. The notification can include a communication with the trusted primary device, where a user can be notified that a confirmation at the trusted device is desired. The confirmation at the trusted primary device can come in the form of a selection of a corresponding code (e.g., FIG. 3A), a description of the device attempting to login or other contextual information (e.g., FIG. 3B), and/or other confirmation including biometrics such as a fingerprint.

Returning to process 500, if the determination is made that the login request does not include a first time web browser user, then process 500 continues to step 514. At step 514, a notification may also be sent to the trusted primary device indicating the desire to login to the web browser. Note that the login access request may derive from the trusted primary device and/or other device associated with the user. Therefore, a trusted primary device may receive a message indicating that the web browser is being logged into.

In response to the notification at step 514, a user can confirm or decline access to the web browser at step 516. If a user does not agree with the login request, login may be declined and login is cancelled at step 518. However, if the user does not decline confirmation, process 500 continues to step 520 where access is granted.

Note that in some instances, additional checks and notifications requesting authorization from the trusted primary device may exist. For example, at web browser login, additional contextual verifications, code verifications, and biometric authentication may exist. As another example, scan, geolocation, merchant, transaction amount, web operating system (OS), and other browser specifics may be included in the verification that the primary user device may be presented with so that the user has more information as to what he/she is giving permission to. Additionally or alternatively, these verification can occur at a time of checking out for a transaction. For example, prior to making a purchase, the trusted primary device may receive a notification that a purchase from a specific merchant for a specific amount is request and that confirmation of such is requested (e.g., FIG. 3B). Note that contextual information may also include geolocation of merchant, geolocation of device making request, type of device (e.g., iPad), address, etc., may be used.

Figure 6:
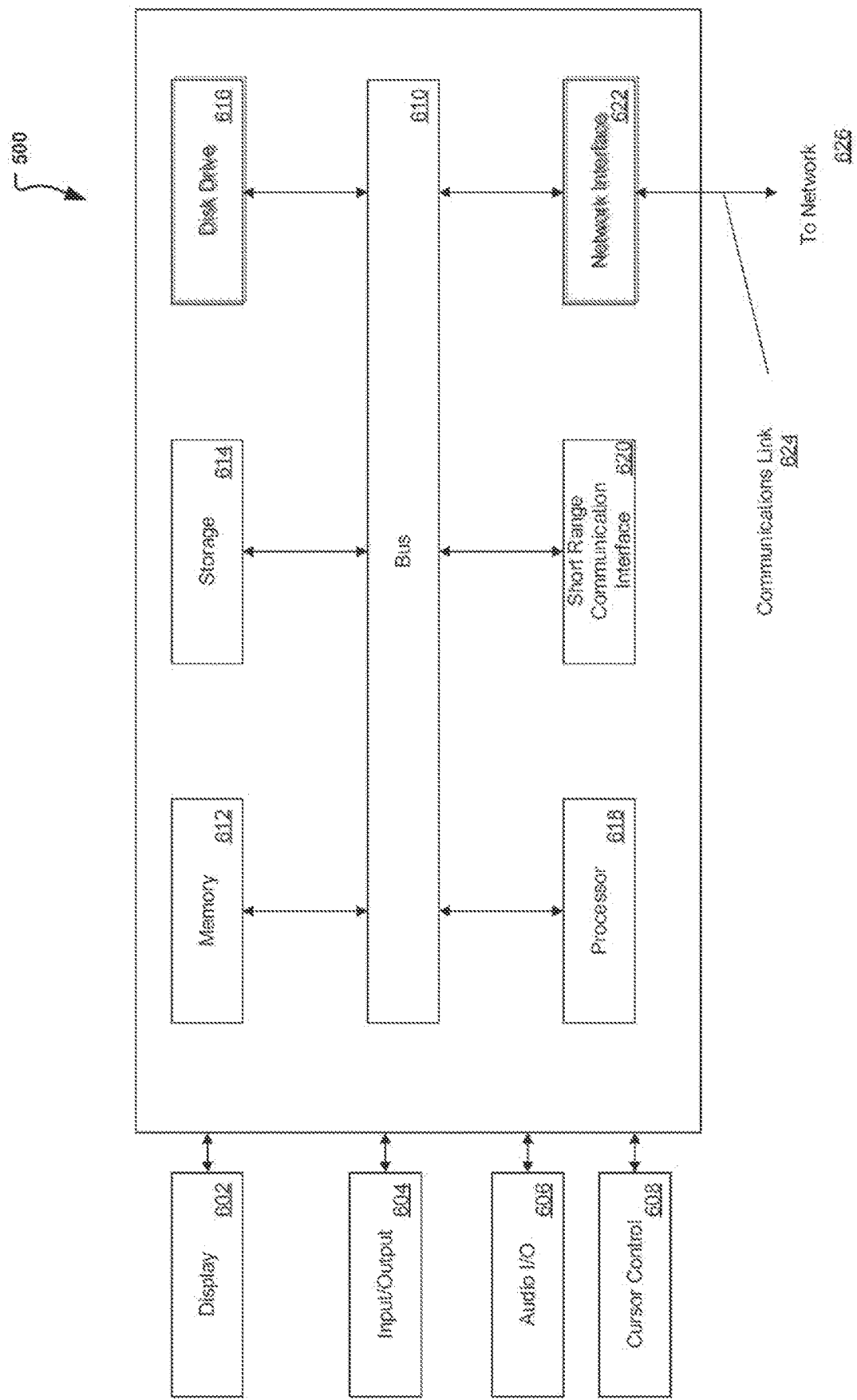
FIG. 6 illustrates an example block diagram of a computer system suitable for implementing one or more devices of the communication systems of FIGS. 2 and 5.

FIG. 6 illustrates an example computer system 600 in block diagram format suitable for implementing on one or more devices of the system in FIG. 2. In various implementations, a device that includes computer system 600 may comprise a personal computing device (e.g., a smart or mobile device 102, a computing tablet, a personal computer, laptop 104, wearable device, PDA, etc.) that is capable of communicating with a network 626. A service provider and/or a content provider may utilize a network computing device (e.g., a network server) capable of communicating with the network. It should be appreciated that each of the devices utilized by users 108, service providers, and content providers may be implemented as computer system 600 in a manner as follows.

Additionally, as more and more devices become communication capable, such as new smart devices using wireless communication to report, track, message, relay information and so forth, these devices may be part of computer system 600. For example, windows, walls, and other objects may double as touch screen devices for users to interact with. Such devices may be incorporated with the systems discussed herein.

Computer system 600 may include a bus 610 or other communication mechanisms for communicating information data, signals, and information between various components of computer system 600. Components include an input/output (I/O) component 604 that processes a user action, such as selecting keys from a keypad/keyboard, selecting one or more buttons, links, actuatable elements, etc., and sending a corresponding signal to bus 610. I/O component 604 may also include an output component, such as a display 602 and a cursor control 608 (such as a keyboard, keypad, mouse, touchscreen, etc.). In some examples, I/O component 604 may include an image sensor for capturing images and/or video, such as a complementary metal oxide semiconductor (CMOS) image sensor, and/or the like. An audio input/output component 606 may also be included to allow a user 108 to use voice for inputting information by converting audio signals. Audio I/O component 606 may allow the user 108 to hear audio. A transceiver or network interface 622 transmits and receives signals between computer system 600 and other devices, such as another user device, a merchant server, an email server, application service provider, web server, a payment provider server, and/or other servers via a network. In various embodiments, such as for many cellular telephone and other mobile device embodiments, this transmission may be wireless, although other transmission mediums and methods may also be suitable. A processor 618, which may be a microcontroller, digital signal processor (DSP), or other processing component, that processes these various signals, such as for display on computer system 600 or transmission to other devices over a network 626 via a communication link 624. Again, communication link 624 may be a wireless communication in some embodiments. Processor 618 may also control transmission of information, such as cookies, IP addresses, images, and/or the like to other devices.

Components of computer system 600 also include a system memory component 614 (e.g., RAM), a static storage component (e.g., ROM), and/or a disk drive 616. Computer system 600 performs specific operations by processor 618 and other components by executing one or more sequences of instructions contained in system memory component 612. Logic may be encoded in a computer readable medium, which may refer to any medium that participates in providing instructions to processor 618 for execution. Such a medium may take many forms, including but not limited to, non-volatile media, volatile media, and/or transmission media. In various implementations, non-volatile media includes optical or magnetic disks, volatile media includes dynamic memory such as system memory component 612, and transmission media includes coaxial cables, copper wire, and fiber optics, including wires that comprise bus 610. In one embodiment, the logic is encoded in a non-transitory machine-readable medium. In one example, transmission media may take the form of acoustic or light waves, such as those generated during radio wave, optical, and infrared data communications.

Some common forms of computer readable media include, for example, hard disk, magnetic tape, any other magnetic medium, CD-ROM, any other optical medium, RAM, PROM, EPROM, FLASH-EPROM, any other memory chip or cartridge, or any other medium from which a computer is adapted to read.

Components of computer system 600 may also include a short range communications interface 620. Short range communications interface 620, in various embodiments, may include transceiver circuitry, an antenna, and/or waveguide. Short range communications interface 620 may use one or more short-range wireless communication technologies, protocols, and/or standards (e.g., WiFi, Bluetooth®, Bluetooth Low Energy (BLE), infrared, NFC, etc.).

Short range communications interface 620, in various embodiments, may be configured to detect other devices (e.g., primary device 102, secondary device 104, etc.) with short range communications technology near computer system 600. Short range communications interface 620 may create a communication area for detecting other devices with short range communication capabilities. When other devices with short range communications capabilities are placed in the communication area of short range communications interface 620, short range communications interface 620 may detect the other devices and exchange data with the other devices. Short range communications interface 620 may receive identifier data packets from the other devices when in sufficiently close proximity. The identifier data packets may include one or more identifiers, which may be operating system registry entries, cookies associated with an application, identifiers associated with hardware of the other device, and/or various other appropriate identifiers.

In some embodiments, short range communications interface 620 may identify a local area network using a short range communications protocol, such as WiFi, and join the local area network. In some examples, computer system 600 may discover and/or communicate with other devices that are a part of the local area network using short range communications interface 620. In some embodiments, short range communications interface 620 may further exchange data and information with the other devices that are communicatively coupled with short range communications interface 620.

In various embodiments of the present disclosure, execution of instruction sequences to practice the present disclosure may be performed by computer system 600. In various other embodiments of the present disclosure, a plurality of computer systems 600 coupled by communication link 624 to the network (e.g., such as a LAN, WLAN, PTSN, and/or various other wired or wireless networks, including telecommunications, mobile, and cellular phone networks) may perform instruction sequences to practice the present disclosure in coordination with one another. Modules described herein may be embodied in one or more computer readable media or be in communication with one or more processors to execute or process the techniques and algorithms described herein.

A computer system may transmit and receive messages, data, information and instructions, including one or more programs (i.e., application code) through a communication link 624 and a communication interface. Received program code may be executed by a processor as received and/or stored in a disk drive component or some other non-volatile storage component for execution.

Where applicable, various embodiments provided by the present disclosure may be implemented using hardware, software, or combinations of hardware and software. Also, where applicable, the various hardware components and/or software components set forth herein may be combined into composite components comprising software, hardware, and/or both without departing from the spirit of the present disclosure. Where applicable, the various hardware components and/or software components set forth herein may be separated into sub-components comprising software, hardware, or both without departing from the scope of the present disclosure. In addition, where applicable, it is contemplated that software components may be implemented as hardware components and vice-versa.

Software, in accordance with the present disclosure, such as program code and/or data, may be stored on one or more computer readable media. It is also contemplated that software identified herein may be implemented using one or more computers and/or computer systems, networked and/or otherwise. Where applicable, the ordering of various steps described herein may be changed, combined into composite steps, and/or separated into sub-steps to provide features described herein.

The foregoing disclosure is not intended to limit the present disclosure to the precise forms or particular fields of use disclosed. As such, it is contemplated that various alternate embodiments and/or modifications to the present disclosure, whether explicitly described or implied herein, are possible in light of the disclosure. For example, the above embodiments have focused on merchants and customers; however, a customer or consumer can pay, or otherwise interact with any type of recipient, including charities and individuals. Thus, "merchant" as used herein can also include charities, individuals, and any other entity or person receiving a payment from a customer. Having thus described embodiments of the present disclosure, persons of ordinary skill in the art will recognize that changes may be made in form and detail without departing from the scope of the present disclosure. Thus, the present disclosure is limited only by the claims.

What is claimed is:

1. A system, comprising
a non-transitory memory storing instructions; and
one or more hardware processors coupled to the non-transitory memory and configured to read the instructions from the non-transitory memory to cause the system to perform operations comprising:

in response to receiving a first request from a web application of a first device, generating a context-based information request;

sending the context-based information request to a second device;

receiving a response to the context-based information request from the second device;

determining that no additional pending requests exist; and in response to determining that no additional pending requests exist, executing an action associated with the first request based on the response.

2. The system of claim 1, wherein the first request is a request to process a transaction.

3. The system of claim 2, wherein the context-based information request includes context information corresponding to the transaction.

4. The system of claim 3, wherein the operations further comprise determining whether the response matches at least one of a predetermined set of acceptable responses, and wherein the predetermined set of acceptable responses was determined based on the context information corresponding to the transaction.

5. The system of claim 1, wherein the second device is designated as a trusted primary device via an asymmetrical cryptography process.

6. The system of claim 1, wherein the operations further comprise:

determining that the response matches at least one of a predetermined set of acceptable responses, wherein the executing the action comprises processing a transaction through a user account based on the first request.

7. A method comprising:

in response to receiving a first login request from a web application of a first device, generating, by a computer system, an authentication request associated with the web application;

sending the authentication request to a second device;

determining whether a response to the authentication request received from the second device matches at least one of a predetermined set of acceptable responses;

determining that no additional login requests are pending; and in response to determining that no additional login request is pending, processing the first login request from the web application of the first device based on whether the response matches the at least one of the predetermined set of acceptable responses.

8. The method of claim 7, wherein the authentication request includes a plurality of sets of digits and associated text instructions.

9. The method of claim 8, wherein the response to the authentication request includes a selection of at least one of the plurality of the sets of digits.

10. The method of claim 9, further comprising:

causing a particular set of digits, from the plurality of sets of digits, to be displayed on the first device, wherein the determining whether the response matches the at least one of the predetermined set of acceptable responses comprises determining whether the at least one of the plurality of the sets of digits is identical to the particular set of digits.

11. The method of claim 7, wherein the second device is designated as a trusted primary device via an asymmetrical cryptography process.

12. The method of claim 7, wherein the processing the first login request comprises:

denying the first login request in response to determining that the response does not match the at least one of the predetermined set of acceptable responses.

13. The method of claim 7, wherein the processing the login request comprises authorizing the login request in response to determining that the response matches the at least one of the predetermined set of acceptable responses.

14. A non-transitory machine-readable medium having stored thereon machine-readable instructions executable to cause a machine to perform operations comprising:

in response to receiving a first transaction request from a web application of a first device, generating an information request;

sending the information request to a second device;

receiving a response to the information request from the second device;

determining that no additional pending transaction requests exist;

in response to determining that no additional pending transaction requests exist, executing an action associated with the first transaction request based on the response to the information request.

15. The non-transitory machine-readable medium of claim 14, wherein the first transaction request corresponds to a purchase transaction.

16. The non-transitory machine-readable medium of claim 15, wherein the information request includes context information corresponding to the purchase transaction.

17. The non-transitory machine-readable medium of claim 16, wherein the operations further comprise:

determining whether the response matches a predetermined response, wherein the predetermined response was determined based on the context information corresponding to the purchase transaction.

18. The non-transitory machine-readable medium of claim 14, wherein the second device is designated as a trusted primary device via an asymmetrical cryptography process.

19. The non-transitory machine-readable medium of claim 14, wherein the executing the action comprises:

denying the first transaction request in response to determining that the response does not match a predetermined response.

20. The non-transitory machine-readable medium of claim 14, wherein the executing the action comprises processing the first transaction request through a user account in response to determining that the response matches a predetermined response.

* * * * *